US012675892B2

(12) United States Patent　(10) Patent No.:　US 12,675,892 B2
Pillai et al.　(45) Date of Patent:　*Jul. 7, 2026

(54) METHODS AND SYSTEMS FOR REGISTERING IMAGES FOR ELECTRONIC DESIGNS

(71) Applicant: Center for Deep Learning in Electronics Manufacturing, Inc., San Jose, CA (US)

(72) Inventors: Suhas Pillai, San Jose, CA (US); Thang Nguyen, San Jose, CA (US); Ajay Baranwal, Dublin, CA (US)

(73) Assignee: Center for Deep Learning in Electronics Manufacturing, Inc., San Jose, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 18/752,594

(22) Filed: Jun. 24, 2024

(65) Prior Publication Data

US 2024/0346669 A1　Oct. 17, 2024

Related U.S. Application Data

(63) Continuation of application No. 17/447,480, filed on Sep. 13, 2021, now Pat. No. 12,045,996.

(Continued)

(51) Int. Cl.
*G06T 7/30*　(2017.01)
*G06N 3/04*　(2023.01)

(52) U.S. Cl.
CPC ................. *G06T 7/30* (2017.01); *G06N 3/04* (2013.01); *G06T 2207/10061* (2013.01); *G06T 2207/20081* (2013.01); *G06T 2207/20084* (2013.01)

(58) Field of Classification Search
CPC ............. G06T 7/30; G06T 2207/10061; G06T 2207/20081; G06T 2207/20084;
(Continued)

(56) References Cited

U.S. PATENT DOCUMENTS

| | | | |
|---|---|---|---|
| 10,733,744 B2 * | 8/2020 | Ha ......................... | G06F 30/00 |
| 2008/0004823 A1 * | 1/2008 | Matsushita ...... | G05B 19/41875 |
| | | | 702/82 |

(Continued)

FOREIGN PATENT DOCUMENTS

| | | | |
|---|---|---|---|
| TW | 201837786 A | 10/2018 | |
| WO | 2020186013 A2 | 9/2020 | |
| WO | WO 2020/186013 | * | 9/2020 |

OTHER PUBLICATIONS

Baranwal et al., A Deep Learning Mask Analysis Toolset Using SEM Digital Twins, SPIE Proceedings VOl. 11518: Photomask Technolgy 2020, Oct. 2020, 21 pages.

(Continued)

*Primary Examiner* — Atiba O Fitzpatrick
(74) *Attorney, Agent, or Firm* — MLO, a professional corp.

(57)　ABSTRACT

Systems for training a convolutional neural network to register images for masks or wafers in semiconductor manufacturing include a computer processor configured to receive a first pair of images aligned in a first modality and a second pair of images aligned in a second modality. Images in the first pair of images and the second pair of images are a computer aided design (CAD) image pre-aligned with a scanning electron microscope (SEM) image. An affine transformation is generated with a convolutional neural network, using one image from the first pair of images and one image from the second pair of images. The one image from the first pair of images is in the first modality and the one image from the second pair of images is in the second modality. Systems (Continued)

for registering images for masks or wafers in semiconductor manufacturing use the trained convolutional neural network.

11 Claims, 10 Drawing Sheets

Related U.S. Application Data

(60) Provisional application No. 63/079,685, filed on Sep. 17, 2020.

(58) Field of Classification Search
CPC . G06T 2207/10072; G06T 2207/30004; G06T 2207/30141; G06T 7/33; G06T 7/0002; G06T 7/0004; G06T 7/0006; G06T 7/0008; G06T 7/001; G06T 2207/30108; G06T 2207/30148; G06T 7/32; G06T 7/337; G06T 7/344; G06T 7/35; G06T 7/37; G06T 7/38; G06T 7/70; G06T 7/73; G06T 7/74; G06T 7/75; G06T 7/77; G06T 5/006; G06T 3/0006; G06T 3/0056; G06T 3/0068; G06T 3/00; G06T 3/0075; G06T 3/20; G06T 3/40; G06T 3/4046; G06T 3/60; G06T 3/608; G06T 9/002; G06T 5/60; G06T 17/00–30; G06T 2200/00–08; G06N 3/04; G06N 3/045; G06N 3/0464; G06N 3/08; G06N 3/09; G06N 3/02–126; G06N 20/00–20; G01N 21/9501–9505; G01N 2021/95676; G01N 2021/95638; G01N 2223/418; G01N 23/225; G01N 23/2251; G01N 23/2252; G01N 23/2254; G01N 29/4481; G01N 15/088; G01N 15/08; G01N 2223/401; G01N 2223/649; G01N 33/2823; H01J 37/26; H01J 37/28; G06F 30/00–398; G06F 18/214–2155; G06F 7/023; G06F 40/16; G06F 30/3308; G06F 30/20; G06F 30/23; G06F 30/28; G06F 30/22; G06F 30/25; G06F 30/27; G06K 9/6256; G06K 9/6257; G06K 9/6259; G06V 10/70; G06V 10/82; G06V 10/774–7796; G06V 10/454; G01V 99/005
See application file for complete search history.

(56) References Cited

U.S. PATENT DOCUMENTS

| | | | | |
|---|---|---|---|---|
| 2017/0148226 A1* | 5/2017 | Zhang | | G06N 3/088 |
| 2017/0200260 A1* | 7/2017 | Bhaskar | | G06F 18/24133 |
| 2017/0200264 A1* | 7/2017 | Park | | G06T 7/001 |
| 2017/0200265 A1 | 7/2017 | Bhaskar et al. | | |
| 2017/0345140 A1 | 11/2017 | Zhang et al. | | |
| 2018/0293721 A1* | 10/2018 | Gupta | | G06N 3/094 |
| 2018/0330511 A1* | 11/2018 | Ha | | G06F 30/00 |
| 2019/0257767 A1* | 8/2019 | Shaubi | | G06N 3/0464 |
| 2019/0333199 A1 | 10/2019 | Ozcan et al. | | |
| 2020/0258212 A1* | 8/2020 | Neumann | | G06N 3/08 |
| 2020/0258227 A1 | 8/2020 | Liao et al. | | |
| 2023/0087977 A1 | 3/2023 | Fan et al. | | |

OTHER PUBLICATIONS

Cao et al., Deep Learning based Inter-Modality Image Registration Supervised by Intra-Modality Similarity, Mach Learn Med Imaging, Sep. 2018, pp. 55-63.
International Search Report and Written Opinion dated Dec. 16, 2021 for PCT Patent Application No. PCT/IB2021/058317.
Notice of Allowance and Fees dated Mar. 29, 2024 for U.S. Appl. No. 17/447,480.
Office Action dated Nov. 14, 2023 for U.S. Appl. No. 17/447,480.
Official Letter and Search Report dated Dec. 2, 2024 for Taiwan Patent Application No. 110134459.

* cited by examiner

106

104

102

100

CAD
Data

FIG. 5

METHODS AND SYSTEMS FOR REGISTERING IMAGES FOR ELECTRONIC DESIGNS

RELATED APPLICATIONS

This application is a continuation of U.S. patent application Ser. No. 17/447,480, filed on Sep. 13, 2021, and entitled "Methods and Systems for Registering Shape Data for Electronic Designs"; which claims priority to U.S. Provisional Application No. 63/079,685, filed on Sep. 17, 2020, and entitled "Methods and Systems for Registering Shape Data for Electronic Designs"; all of which are hereby incorporated by reference in their entirety.

BACKGROUND

The present disclosure is related to lithography, and more particularly to the design and manufacture of a surface which may be a reticle, a wafer, or any other surface, using charged particle beam lithography.

Three common types of charged particle beam lithography are unshaped (Gaussian) beam lithography, shaped charged particle beam lithography, and multi-beam lithography. In all types of charged particle beam lithography, charged particle beams shoot energy to a resist-coated surface to expose the resist.

In lithography the lithographic mask or reticle comprises geometric patterns corresponding to the circuit components to be integrated onto a substrate. The patterns used to manufacture the reticle may be generated utilizing computer-aided design (CAD) software or programs. In designing the patterns, the CAD program may follow a set of pre-determined design rules in order to create the reticle. These rules are set by processing, design, and end-use limitations. An example of an end-use limitation is defining the geometry of a transistor in a way in which it cannot sufficiently operate at the required supply voltage. In particular, design rules can define the space tolerance between circuit devices or interconnect lines. The design rules are, for example, used to ensure that the circuit devices or lines do not interact with one another in an undesirable manner. For example, the design rules are used so that lines do not get too close to each other in a way that may cause a short circuit. The design rule limitations reflect, among other things, the smallest dimensions that can be reliably fabricated. When referring to these small dimensions, one usually introduces the concept of a critical dimension. These are, for instance, defined as the important widths or areas of a feature or the important space between two features or important space areas, those dimensions requiring exquisite control.

One goal in integrated circuit fabrication by optical lithography is to reproduce the original circuit design on a substrate by use of a mask or photomask, in which the photomask is created by exposing a surface or a reticle using charged particle beam lithography. Integrated circuit fabricators are always attempting to use the semiconductor wafer real estate as efficiently as possible. Engineers keep shrinking the size of the circuits to allow the integrated circuits to contain more circuit elements and to use less power. As the size of an integrated circuit critical dimension is reduced and its circuit density increases, the critical dimension of the circuit pattern or physical design approaches the resolution limit of the optical exposure tool used in conventional optical lithography. As the critical dimensions of the circuit pattern become smaller and approach the resolution value of the exposure tool, the accurate transcription of the physical design to the actual circuit pattern developed on the resist layer becomes difficult. To further the use of optical lithography to transfer patterns having features that are smaller than the light wavelength used in the optical lithography process, a process known as optical proximity correction (OPC) has been developed. OPC alters the physical design to compensate for distortions caused by effects such as optical diffraction and the optical interaction of features with proximate features. Resolution enhancement technologies performed with a reticle include OPC and inverse lithography technology (ILT).

OPC may add sub-resolution lithographic features to mask patterns to reduce differences between the original physical design pattern, that is, the design, and the final transferred circuit pattern on the substrate. The sub-resolution lithographic features interact with the original patterns in the physical design and with each other and compensate for proximity effects to improve the final transferred circuit pattern. One feature that is added to improve pattern transference is referred to as a "serif." Serifs are small features that enhance precision or resiliency to manufacturing variation of printing of a particular feature. As an example, a serif that is positioned on a corner of a pattern may sharpen the corner in the final transferred image. Patterns that are intended to print on the substrate are referred to as main features. Serifs are a part of a main feature. It is conventional to discuss the OPC-decorated patterns to be written on a reticle in terms of main features, that is features that reflect the design before OPC decoration, and OPC features, where OPC features might include serifs, jogs, sub-resolution assist features (SRAFs) and negative features. OPC features are subject to various design rules, such as a rule based on the size of the smallest feature that can be transferred to the wafer using optical lithography. Other design rules may come from the mask manufacturing process or, if a character projection charged particle beam writing system is used to form the pattern on a reticle, from the stencil manufacturing process.

In the manufacture of integrated circuits using a photomask, manufacture of the photomask containing the original circuit design is a critical step of the process. The final photomask must be defect-free, within a pre-determined tolerance, since any defect on the photomask may be reproduced on all wafers manufactured using that photomask. Due to limitations of materials and processes, most or all newly-fabricated photomasks will have imperfections. In a process called mask inspection, a newly-fabricated photomask is analyzed to find imperfections. Each of these imperfections, or potential defects, is then further analyzed to determine if the imperfection is a real defect that will cause a defect on wafers manufactured with this photomask. Imperfections that are identified as real defects can be repaired in a subsequent process called mask repair to create a defect-free photomask suitable for manufacturing wafers.

SUMMARY

In some embodiments, methods for training a convolutional neural network to register images for electronic designs include inputting a first pair of images aligned in a first modality and a second pair of images aligned in a second modality. An affine transformation is generated with a convolutional neural network, using one image from the first pair of images and one image from the second pair of images. The one image from the first pair of images is in the first modality and the one image from the second pair of images is in the second modality.

In some embodiments, methods for registering images for electronic designs include inputting a pair of images, wherein the pair of images comprises a computer aided design (CAD) image and a scanning electron microscope (SEM) image. The CAD image is registered to the SEM image, using a trained convolutional neural network, wherein the trained convolutional neural network further comprises an affine transformation.

In some embodiments, a system for training a convolutional neural network to register images for masks or wafers in semiconductor manufacturing includes a computer processor configured to receive a first pair of images aligned in a first modality and a second pair of images aligned in a second modality, wherein images in the first pair of images and the second pair of images are a computer aided design (CAD) image pre-aligned with a scanning electron microscope (SEM) image. A computer processor is configured to generate an affine transformation with a convolutional neural network, using one image from the first pair of images and one image from the second pair of images, wherein the one image from the first pair of images is in the first modality and the one image from the second pair of images is in the second modality.

In some embodiments, a system for registering images for masks or wafers in semiconductor manufacturing includes a computer processor configured to receive a pair of images, wherein the pair of images comprises a computer aided design (CAD) image and a scanning electron microscope (SEM) image. A computer processor is configured to register the CAD image to the SEM image, using a trained convolutional neural network that has been trained with a first pair of CAD and SEM images pre-aligned in a first modality and a second pair of CAD and SEM images pre-aligned in a second modality, wherein the trained convolutional neural network comprises an affine transformation using one image from the first pair of images and one image from the second pair of images.

BRIEF DESCRIPTION OF THE DRAWINGS

FIG. 5 is a diagram for training a neural network architecture for registering images using a patched base network, in accordance with some embodiments.

DETAILED DESCRIPTION

Figure 1:
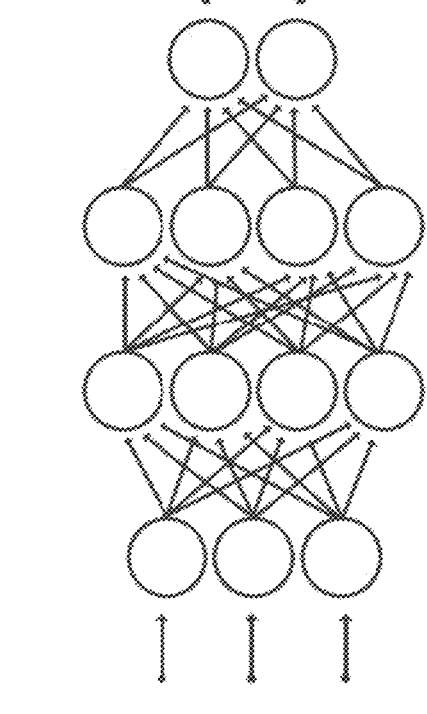
FIG. 1 is a diagram of a neural network architecture to generate scanning electron microscope (SEM) images, as disclosed in U.S. patent application Ser. No. 17/022,363.
Figure 1:
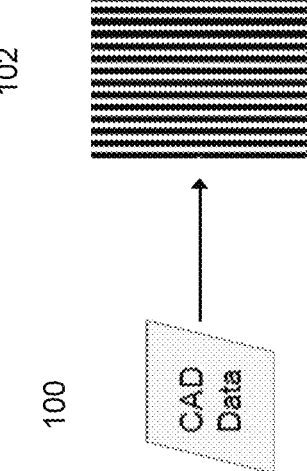

Inspection processes for masks and wafers often involve taking SEM images. However, SEM images taken by mask shops are often misaligned with the corresponding CAD/design-data that were used to make the masks. The misalignment happens when SEM machines do not take SEM images at the same CAD data location due to offsets in translation, rotation, and scaling. Often coordinates on SEM pictures are not accurate either. For these reasons, for applications such as deep learning projects that require both CAD data and their resulting SEM images, CAD to SEM image alignment is essential. While traditional algorithm-based image alignment approaches are available, they are limited, particularly for two different image domains, such as CAD and SEM. For same-domain image alignment, i.e., CAD to CAD or SEM to SEM, existing methods only work for a small range of translation, rotation, and scaling. For cross-domain image alignment, i.e., CAD to SEM, existing iterative and feature extraction-based methods fail to work for most of the translation, rotation, and scaling values. Many deep learning based supervised and unsupervised medical imaging methods showed promising image alignment results for the same domain images.

Deep learning (DL) has solved problems in a wide range of industries-retail, information technology (IT), medical, pharmaceuticals, biotechnological, and autonomous driving to name just a few. Likewise, deep learning recipes for recommendation, segmentation, classification, anomaly detection and digital modeling are highly relevant to the manufacture of photomasks, printed circuit boards (PCBs) and flat panel displays (FPDs). Photomask shops face challenges with mask inspection, as well as detecting and classifying hotspots, faults and defects that impede production. Deep learning has the potential to solve these challenges before they become real problems on the production line. Digital twins that model the properties, conditions and attributes of real-world counterparts in electronics manufacturing have significant advantages over real data in simulating the behavior of the system. Digital twins allow manufacturers to observe, reproduce, and find faults in the system at a software level, long before they stop or slow down a production line.

The types of problems deep learning can solve include natural language understanding to extract meaningful information from text documents and information retrieval and language translation. In the speech domain, DL has shown tremendous progress in automatic speech recognition, text-to-speech and realistic-speech generation. Related to computer vision, DL offers effective solutions for a multitude of problems, such as detecting objects, segmenting objects in magnetic resonance imaging (MRI) scans, de-noising images, extracting text from images, performing image-based searches, improving the quality of images and even creating new images. DL has introduced advancements in finding anomalies in the form of outliers, by learning the accurate distribution of normal data, so that DL can flag any anomalous data. DL even has the ability to help build digital twins to simulate physical environments.

Many of the problems in photomask manufacturing, such as conventional optical proximity correction (OPC), inverse lithography technology (ILT), lithography hotspot detection, fault detection and classification, automatic mask defect classification and diagnostics, and SEM de-noising and contour extraction can benefit from deep learning.

Computer-aided engineering (CAE) technology can also be applied to scanning electron microscope (SEM) images of physically manufactured masks or wafers. Such an application may aid in automatically categorizing potential defects such as mask defects. In typical semiconductor manufacturing, potential defects on masks are identified by mask inspection, during which an image of the entire mask—a full-field mask image—is generated. That image is fuzzy and relatively low-resolution, but it is of the entire mask. This mask inspection process is designed to identify questionable spots where further inspection is required. Further inspection is done by taking much more accurate SEM images and analyzing these images. This further inspection is accomplished using a defect inspection SEM machine. Defect inspection SEM machines can take very detailed images, but have a limited field of view, such as 1 μm×1 μm to 10 μm×10 μm. Therefore, potential defect areas are first identified in the full-field mask image generated by mask inspection, then details of the potential defect areas are examined in the SEM image. In the leading-edge nodes, the number of suspected areas identified as well as the number of actual defects on a typical production mask are much larger than with earlier nodes. At the beginning of the $21^{st}$ century, tens of defects on a mask were repaired—masks with more errors than this were discarded and re-manufactured. This has evolved to hundreds of problems being common in leading-edge masks, where all must be repaired. Re-manufacturing of masks has become less common, since a re-manufactured mask will likely also have hundreds of defects. Repairing of defects is unique to mask manufacturing; wafers are not repaired. Masks are worth repairing because an error on the mask will be reproduced on every wafer produced using that mask. Thus, in some embodiments the use of SEM images can be used in training of the neural networks of the present methods to help identify mask defects. Simulation of a mask image to generate a SEM image (e.g., simulated SEM image) as well as emulated SEM images (from mask inspection) may also be used in training of the neural networks.

FIG. 1 is a diagram of generating a SEM image starting with simulating a mask image 102 from a physical design 100 as described in U.S. patent application Ser. No. 17/022, 363, filed on Sep. 16, 2020, and entitled "Methods and Systems for Generating Shape Data for Electronic Designs," owned by the assignee of this patent application and incorporated by reference for all purposes. The input physical design 100 may also be referred to as shape data for a set of electronic designs, where the set of shape data represents a set of shapes for a device fabrication process. The set of shape data may be created using lithography simulation. The device fabrication process may be, for example, a semiconductor fabrication process or a flat panel display fabrication process, where the process can include mask designs, simulations or manufactured shapes utilizing CAD. Once CAD image 102 is input to a neural network 104, a SEM image 106 can be generated. Conventional methods for generating SEM images utilize simulation methods only and lack real edge roughness and SEM noise, which are attributes in actual SEM images used in defect analysis.

In the present disclosure, a pair of images, such as a CAD image and its corresponding real SEM image, can be used in training a neural network to generate SEM images more accurately. For the neural network to learn from the pair of images, the images need to be properly aligned with each other. Otherwise, the neural network will learn to produce SEM images from offset or merged geometries. A method for aligning two images is to register them into one coordinate system, prior to training.

Figure 2:
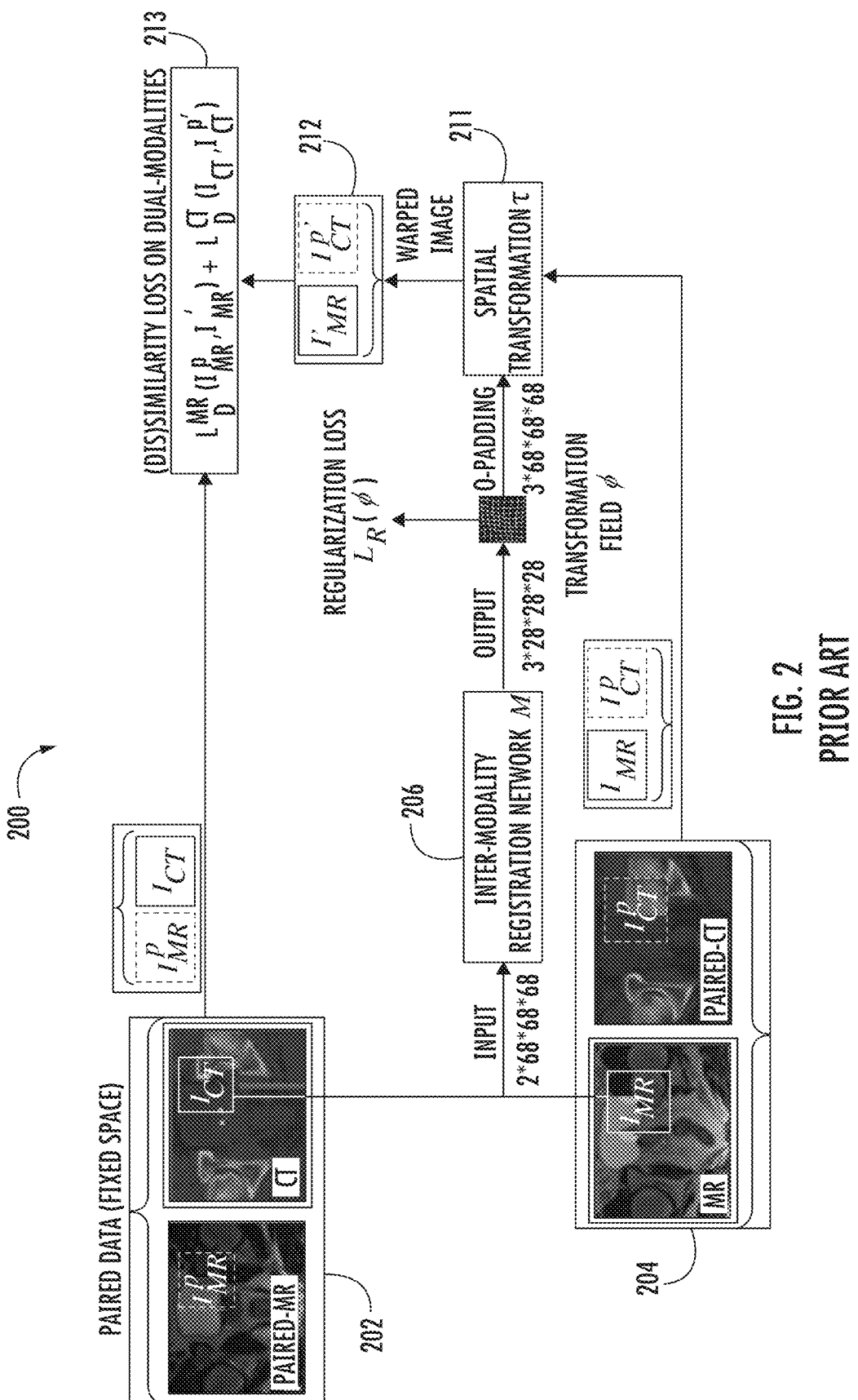
FIG. 2 is a diagram for training a neural network architecture for registering images, as known in the art.

FIG. 2 illustrates training of a known non-rigid inter-modality registration network 200 (from Cao, Xiaohuan, et al., "Deep learning based inter-modality image registration supervised by intra-modality similarity," *International Workshop on Machine Learning in Medical Imaging*, Springer, Cham, 2018) that is used to align medical images produced from two different imaging protocols (shown here as magnetic resonance "MR" vs. computer tomography "CT") to fuse the information from two modalities. A non-rigid transformation used in this network allows deformation of portions of the image to align. The network 200 is trained by using intra-modality similarity guidance from the input of a pre-aligned pair of images 202 to directly predict the transformation field from the input images. A pre-aligned image database is used to train inter-modality registration from an intra-modality similarity metric (maximizing the image similarity) based on paired data from the pre-aligned (in fixed space, that is the images are fixed and are not allowed to change) image database. In the testing stage, the trained inter-modality registration subnetwork 206 can be directly applied to register the new multimodal images without any paired data. The registration subnetwork 206 is based on a U-net architecture, with an encoding path (2× down-sampling), and decoding path (2× up-sampling), employing skip connections, batch normalization and ReLU with a 3×3×3 sized kernel. There is a spatial transformation layer 211 to warp (transform) the image 204 (in moving space, where the image is allowed to change) to evaluate loss 213. Loss 213 is based on a (Dis)similarity loss on dual-modalities. Image similarity is measured with a warped (transformed) image 212 in moving space and its counterpart, from the pre-aligned image database, to employ any effective intra-modality similarity metric while measuring the alignment of the pre-aligned pair of images 202.

In comparison to the conventional methods of FIG. 2, the present registration methods provide new techniques tailored for registering CAD and SEM images in electronic designs. The methods provide accurate registration for CAD and SEM images, which are 2-dimensional and require transformational changes without modifying the shapes in the input images.

Figure 3:
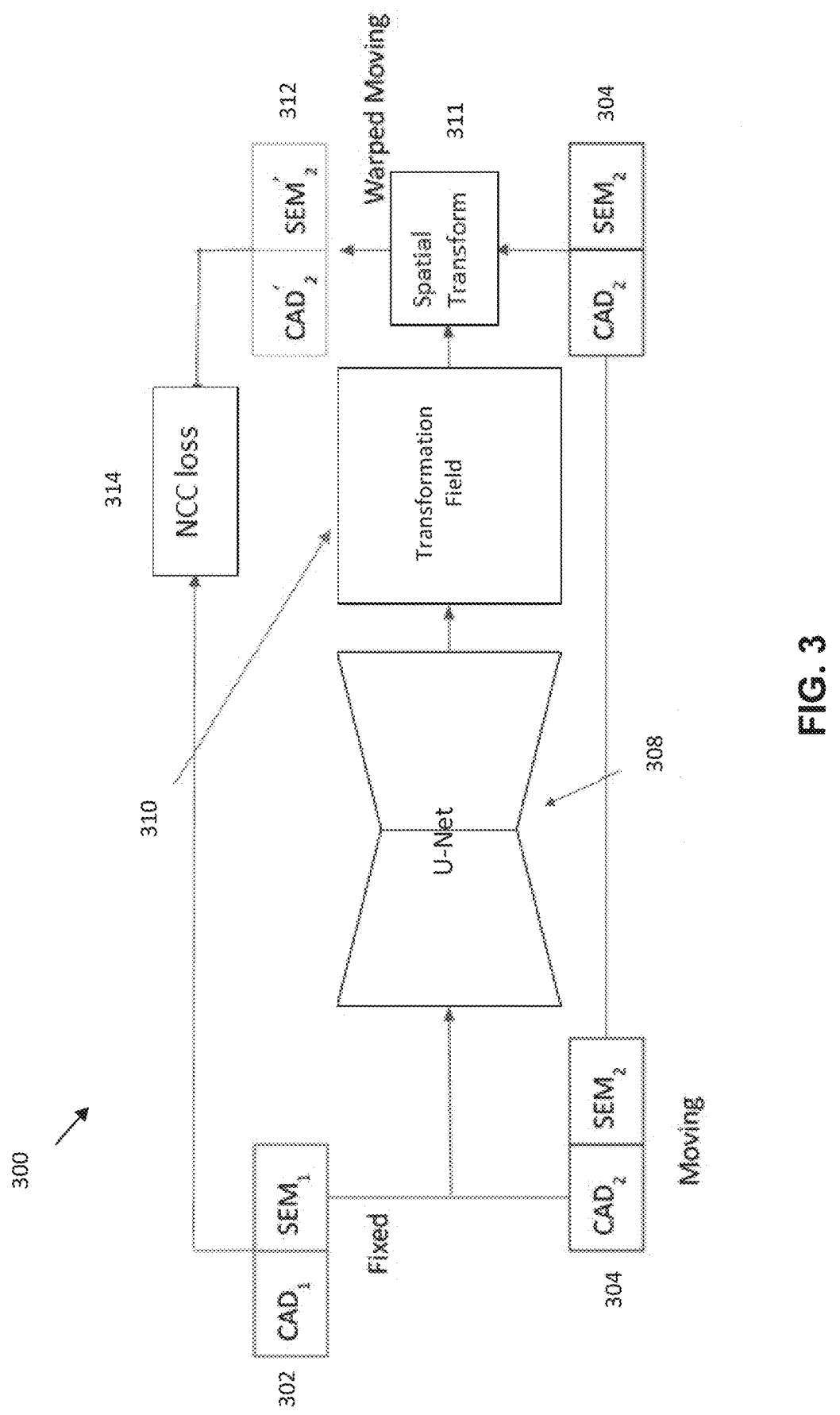
FIG. 3 is a diagram for training a neural network architecture for registering a CAD image to a SEM image, in accordance with some embodiments.

FIG. 3 illustrates training a registration network 300 to register CAD and SEM pairs into a single modality using pairs of CAD images pre-aligned with SEM images. In FIG. 3, pre-aligned image pair 302 ($CAD_1$, $SEM_1$) is in one modality (e.g., coordinate system), and pre-aligned image pair 304 ($CAD_2$, $SEM_2$) is in another modality. The training uses a conventional neural network but uses new data of CAD and SEM images as input compared to conventional methods (e.g., medical images of the network 200 in FIG. 2). One image of a first modality from the pre-aligned image pair 302 is combined with one image of a second modality from the pre-aligned image pair 304, and the combined pair is input to the conventional neural network. For example, in FIG. 3, image $SEM_1$ from pre-aligned image pair 302 is combined with image $CAD_2$ from pre-aligned image pair 304 and input into a U-Net 308. In another embodiment (not shown), image $CAD_1$ from pre-aligned image pair 302 is combined with image $SEM_2$ from pre-aligned image pair 304. A transformation field 310, representing a different modality from the first and second modality, but serving as a common modality for the two modalities, is output from the U-Net 308 and represents what the U-Net 308 learned about the image modalities. The transformation field 310 is then used as a map in a spatial transformation block 311, and the pre-aligned image pair 304 is registered with the common modality of the transformation field 310 to generate CAD, SEM image pair 312 ($CAD'_2$, $SEM'_2$).

A Normalized Cross Correlation (NCC) 314 is used to calculate the dissimilarity of the CAD-SEM image pair 312 which are now in the common modality created by transformation field 310. NCC is a robust measure when dealing with the intra-modality images that may potentially have some noises and intensity inconsistency. NCC can be implemented as a simple convolution operation, which is flexible to be embedded into the convolutional neural network (CNN) for effective forward and backward propagations during training. The present methods utilize the insight that NCC provides benefits for the particular process of registering CAD and SEM image pairs, rather than the (Dis) similarity loss 213 of conventional network 200. The registration network 300 also uses data of CAD and SEM image pairs of physically manufactured masks or wafers, taking one image of a first modality and pairing it with another image of a second modality to establish a transformation for aligning the images.

Figure 4:
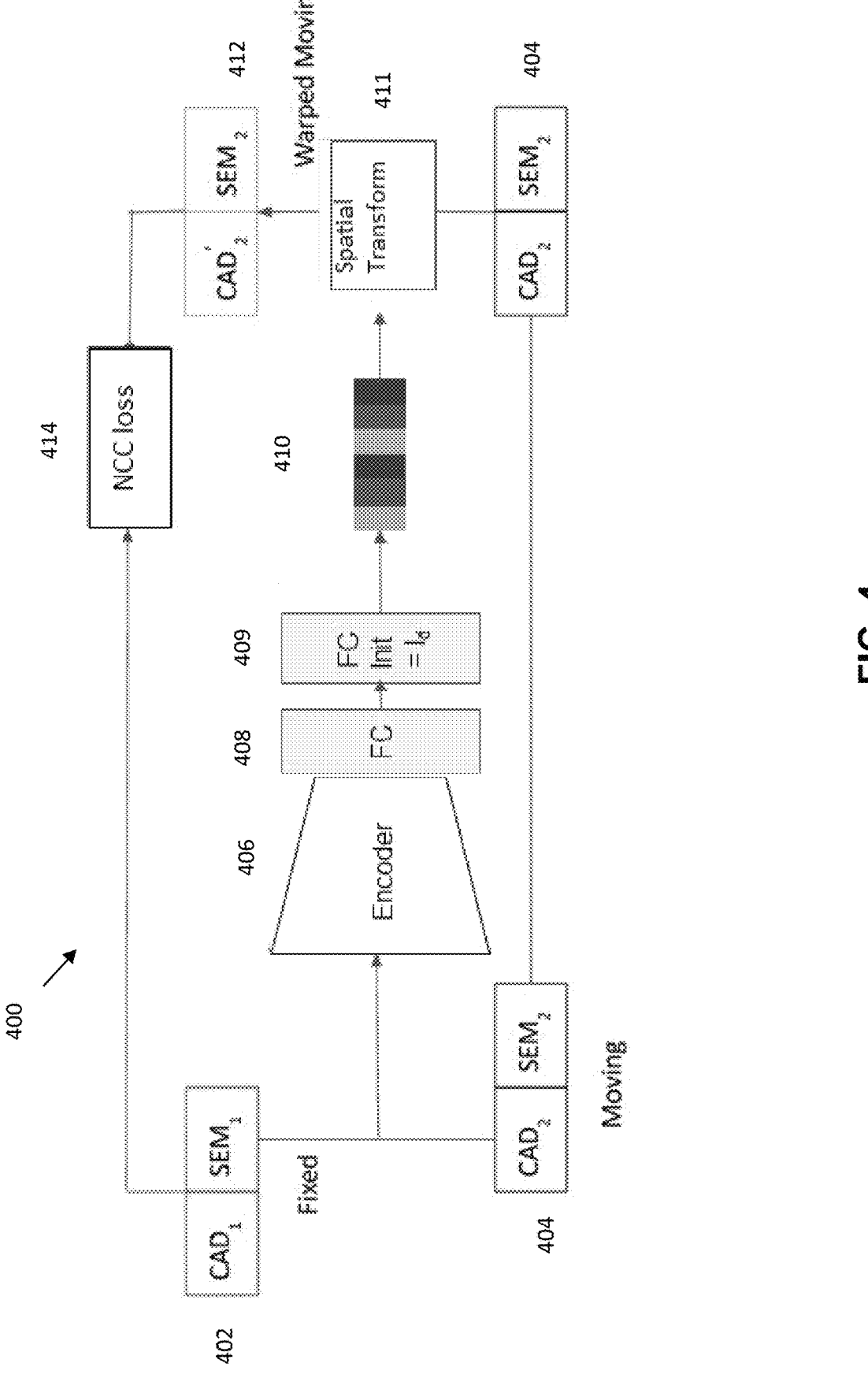
FIG. 4 is a diagram for training a neural network architecture for registering images, in accordance with some embodiments.

A diagram of an embodiment of training a registration network 400 is shown in FIG. 4, to register images of different modalities (i.e., inter-modality). FIG. 4 provides a high accuracy of registering images by using an affine transformation to replace the transformation field 310 of FIG. 3. A pair of images 402 and a pair of images 404 are a first pair of images and a second pair of images that are input in the method of FIG. 4 for training a convolutional neural network to register images for electronic designs. The first pair of images 402 ($CAD_1$, $SEM_1$) are aligned by a first modality and the second pair of images 404 ($CAD_2$, $SEM_2$) aligned by a second modality using a process to generate training data described in FIG. 6. One image from the first pair of images 402 (e.g., a $SEM_1$) and one image (e.g., a $CAD_2$) from the second pair of images 404 are combined to form a pair of images (e.g., $CAD_2$, $SEM_1$) that are in different modalities, and that is misaligned with respect to each other. The pair of images ($CAD_2$, $SEM_1$) is input to an encoder 406.

Figure 6:
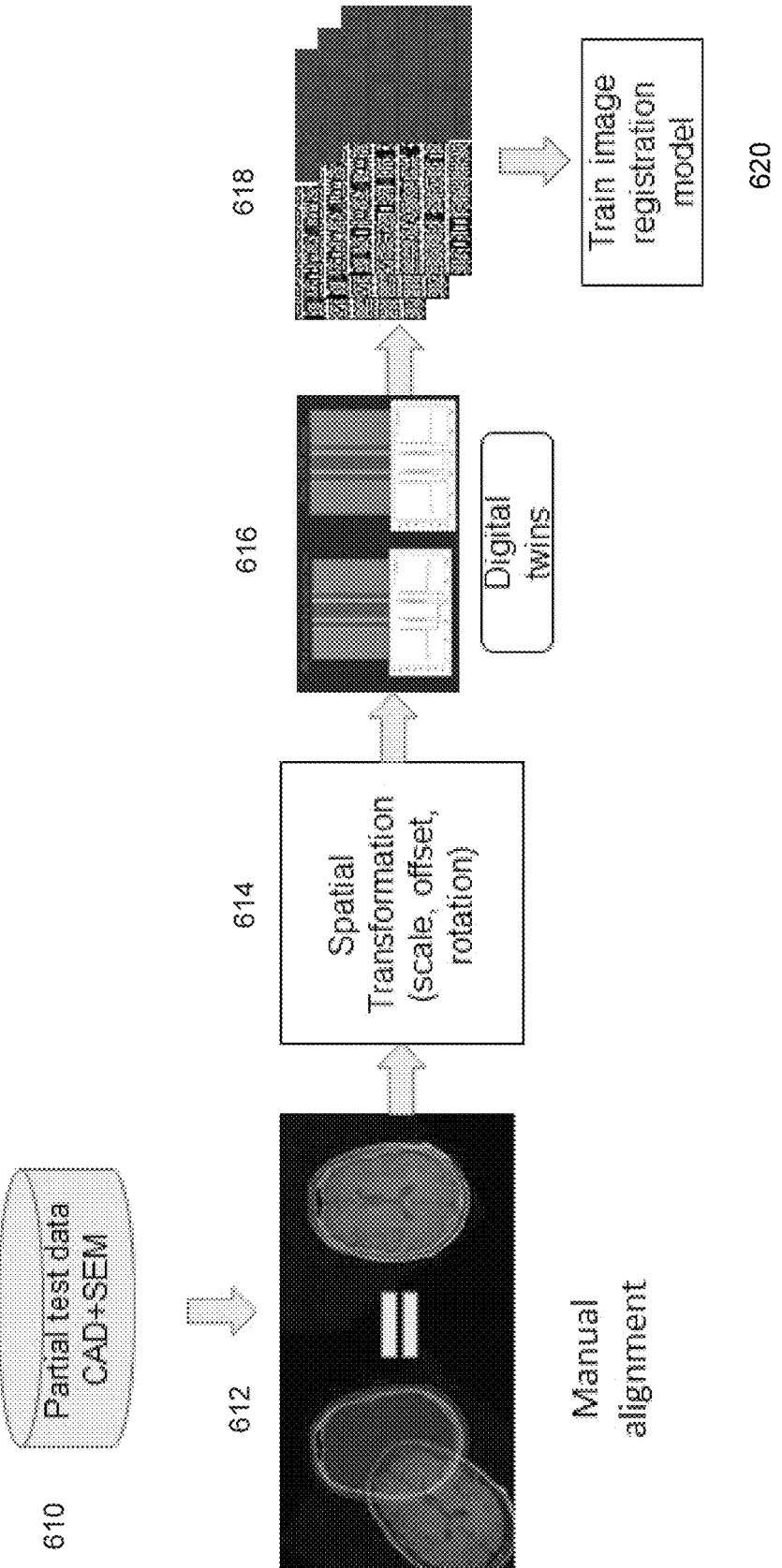
FIG. 6 is a diagram for generating test data for training a registration model, in accordance with some embodiments.

In embodiments, the first and second pair of images 402 and 404 have previously been aligned using affine transformation (as shall be described in FIG. 6). Affine transformation is also used in the registration network of FIG. 4. Affine transformation is a linear mapping method that preserves points, straight lines, and planes. For example, sets of parallel lines remain parallel after an affine transformation. In one embodiment, the decoder portion of the U-Net 308 and the transformation field 310 of FIG. 3 are replaced by a subnetwork comprising 408, 409 and 410 as shown in FIG. 4. The subnetwork includes a fully connected ("FC" in figure) layer 408, a fully connected initialization ("FC Init" in figure) layer 409 and transformation values 410 representing a relation between images 404 in an affine transformation comprising two values each for scalar, translation and rotation. In FIG. 3, the conventional decoder of U-Net 308 used in registration network for non-rigid registration makes actual modifications to the moving image pair 304. Since CAD images are defined by design rules which need to be preserved, the registration network 400 provides high accuracy by use of an affine transformation, which preserves those features. The registration network 400 advantageously preserves features learned in the encoder 406. Thus, in some embodiments the decoder and transformation field of conventional subsystems are instead replaced with the subnetwork comprising FC layer 408, FC Init layer 409, and transformation values 410, producing an affine transformation which comprises scaling, translation and rotation only. The use of only scaling, translation and rotation eliminates distortion of images that can be caused by non-rigid registration.

In another embodiment, only the CAD images ($CAD_1$ and $CAD_2$') are used to calculate the NCC loss 414 rather than using both CAD and SEM images. Using only CAD images provides benefits in computing time, since SEM images have noise, line edge roughness and contrast and brightness adding to their complexity and making it take longer for the neural network to converge. In experimental runs performed in relation to the present disclosure, training time was reduced for the neural network to register CAD images to SEM images by measuring NCC loss over CAD registration only.

The methods involve generating an affine transformation from a pair of images with different modalities with a convolutional neural network and registering the CAD image to SEM image in the second pair of images with the affine transformation. The size of both pairs of images 402 and 404 are 512×512 in this example of FIG. 4. The encoder 406 has a kernel size of 4×4 with weights, and channels vary from 32 up to 512. An image of size 2×2 with 256 channels is output from encoder 406 and then convolved with a 2×2 image with 512 channels outputting a 1×1 image with 512 channels. The 1×1 image output is connected to the FC layer 408 with 512 units and normal initialization (Xavier). The FC layer is followed by the FC Init layer 409 which outputs six transformation values 410 representing an affine transformation. The six transformation values 410 are two values in a 2×3 matrix for each of the three transformations, for example:

scaling=[[s_x, 0, 0], [0, s_y, 0]]
translation=[[1, 0, t_x], [0, 1, t_y]]
rotation=[[cos(angle), sin(angle), 0], [−sin(angle), cos (angle), 0]]

The affine transformation is initialized in the FC Init layer 409. The FC Init layer 409 has weights initialized to 0 and a bias initialized to [1,0,0,0,1,0] allowing the network to converge. After the affine transformation is applied in spatial transformation 411 to the misaligned pair, re-aligning the $CAD_2$ image to the $SEM_2$ image, an aligned pair 412 ($CAD_2$', $SEM_2$) is registered using the initialized affine transformation values 410. A normalized cross correlation (NCC) loss 414 is measured over the pre-aligned $CAD_1$ image (in pair of images 402) and the re-aligned $CAD_2$' image (in aligned pair 412). The NCC loss is used to verify registration of the second pair of images ($CAD_2$', $SEM_2$) against the first pair of images ($CAD_1$, $SEM_1$). The learned affine transformation allows the CAD image to be registered in the SEM coordinate system, beneficially preserving the CAD geometry relative to the SEM image. It is important to note that the SEM image ($SEM_2$) is not transformed relative to $CAD_2$', because of the added complexity of $SEM_2$. That is, $CAD_2$' is registered onto the coordinate system of $SEM_2$.

Figure 5:
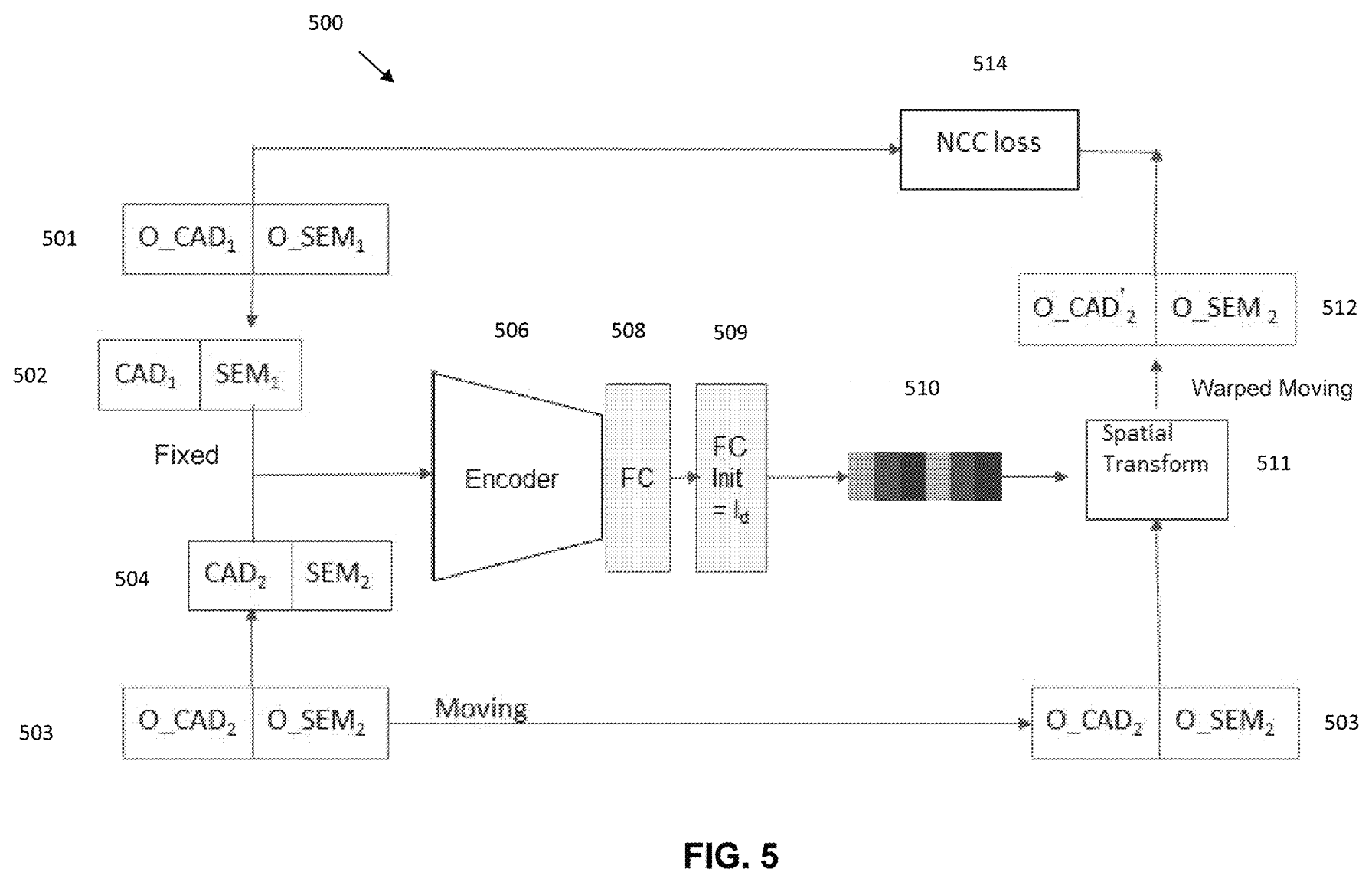

In order to align bigger images required to accurately generate a SEM image, for example in the neural network shown in FIG. 1, FIG. 5 illustrates training a registration method using a patched base network 500. The patched based network 500 uses patch pairs 502 ($CAD_1$, $SEM_1$) and 504 ($CAD_2$, $SEM_2$), which are portions of an image instead of an entire image, and applies the learned transformation to the original pair 503 (O_$CAD_2$, O_$SEM_2$). That is, a pair of patches (502, 504) is taken from the first pair of images 501 and the second pair of images 503, respectively; where the affine transformation learned from a combination of the pair of patches is applied to the second pair of images. Image pairs O_$CAD_1$, O_$SEM_1$ (original aligned pair of images 501) and O_$CAD_2$, O_$SEM_2$ (original aligned pair 503) in this example are 1024×1024. Allowing the neural network to use a patch instead of the entire image (i.e., smaller size image than the full image) allows cropping to focus on portions of a SEM that have more geometries, as SEM images may have areas where no geometries are located.

This cropping may also beneficially save computing time, which is important in computing intensive processes such as mask inspection.

The pair of patches has a size that is smaller than the first pair of images and the second pair of images. In an example embodiment of the method of FIG. 5, patch pair 502 (CAD₁, SEM₁) of size 512×512 is taken from the center of O_CAD₁, O_SEM₁ (original aligned pair of images 501). Similarly, patch pair 504 (CAD₂, SEM₂) of size 512×512 is taken from the center of O_CAD₂, O_SEM₂. The patches are combined to form a misaligned pair and are input to the encoder 506 where images are convolved (as described for encoder 406 in FIG. 4). An affine transformation is learned from a fully connected layer FC 508 and initialized in an initialization layer 509 (FC_Init). The initialized affine transformation 510 is applied to O_CAD₂, O_SEM₂ 503 in the spatial transformation 511 to result in aligned (i.e., registered) pair 512 (O_CAD'₂, O_SEM₂), and an NCC loss is measured in 514 as described for NCC loss 414 in neural network 400 in FIG. 4. The NCC loss 514 is used to adjust a set of parameters for the convolutional neural network, to improve the accuracy of the registration. For example, NCC loss measures how similar two images are registered. A well registered pair of images will result in a NCC loss closer to 1. If the NCC loss is closer to 0, the registration has failed and the weights of the kernel in the encoder weights are adjusted.

In embodiments, methods for registration of images for electronic designs include inputting a pair of images (i.e., simulated image, SEM pair). A convolutional neural network is used on a combination of the pair of images, where the convolutional neural network comprises an inter-modality registration network, and where the inter-modality registration network further comprises an affine transformation. A registered pair of images 412 or 512 is determined with the inter-modality registration network. The registered pair of images comprises a computer aided design (CAD) image and a scanning electron microscope (SEM) image. In some embodiments, the CAD image is created using lithography simulation.

In embodiments, a method for registration of a pair of images for electronic designs includes inputting two pairs of images (e.g., first pair of images 402 and second pair of images 404, or first patch pairs 502 and second patch pairs 504). A set of parameters is input, including a set of convolution layers for a neural network. A CAD image is registered with a SEM image in the pair of images, using the set of convolution layers of the neural network, where the neural network further comprises an affine transformation. A loss comprising an NCC loss is calculated, and the set of parameters including the set of convolution layers is adjusted.

In some embodiments, the pairs of images further comprise a CAD image pre-aligned with a SEM image (e.g., pairs of images 402, 404 or patch pair 502, 504), where the alignment uses affine transformation. In some embodiments, the neural network further comprises an encoder and the set of parameters for the encoder comprises a kernel size of 4×4 with channels varying from 32, 64, 128, 256 and 512 for each convolution layer. In some embodiments, a patch of the pair of images has a size 512×512 and is taken from a 1024×1024 image in the pair of images and used to determine the registration of the CAD image to the SEM image. In some embodiments, the neural network further comprises a fully connected layer outputting an affine transformation and an initialization of the affine transformation.

FIG. 6 is a diagram of an embodiment for generating images to use as test/training data for training a registration network. Pairs of images 610 are manually aligned 612, such as with the aid of a software alignment tool using affine transformation only. In the manual alignment 612, a user identifies scaling, translation (offset in figure) and rotation transformation values 614 to be used to align each pair images 610, producing a range of scaling, translation and rotation values. The range is restricted to preserve design rules used to create CAD images. The identified range of affine transformation values 614 is used to synthesize many (e.g., millions) of aligned pairs 618 in different modalities using digital twin 616. The synthesized pairs 618 are used as input to train a registration model 620 (for example, registration network 400 in FIG. 4) which learns an affine transformation. For example, in some embodiments the pairs of images have been synthesized from an original pair of images that have been manually aligned using affine transformation. The registration model 620 uses a first pair of images and a second pair of images (pairs of images 610) that have been synthesized using digital twin 616 and an affine transformation (per transformation values 614, which is a previous affine transformation that is different from the affine transformation learned in model 620).

Figure 7:
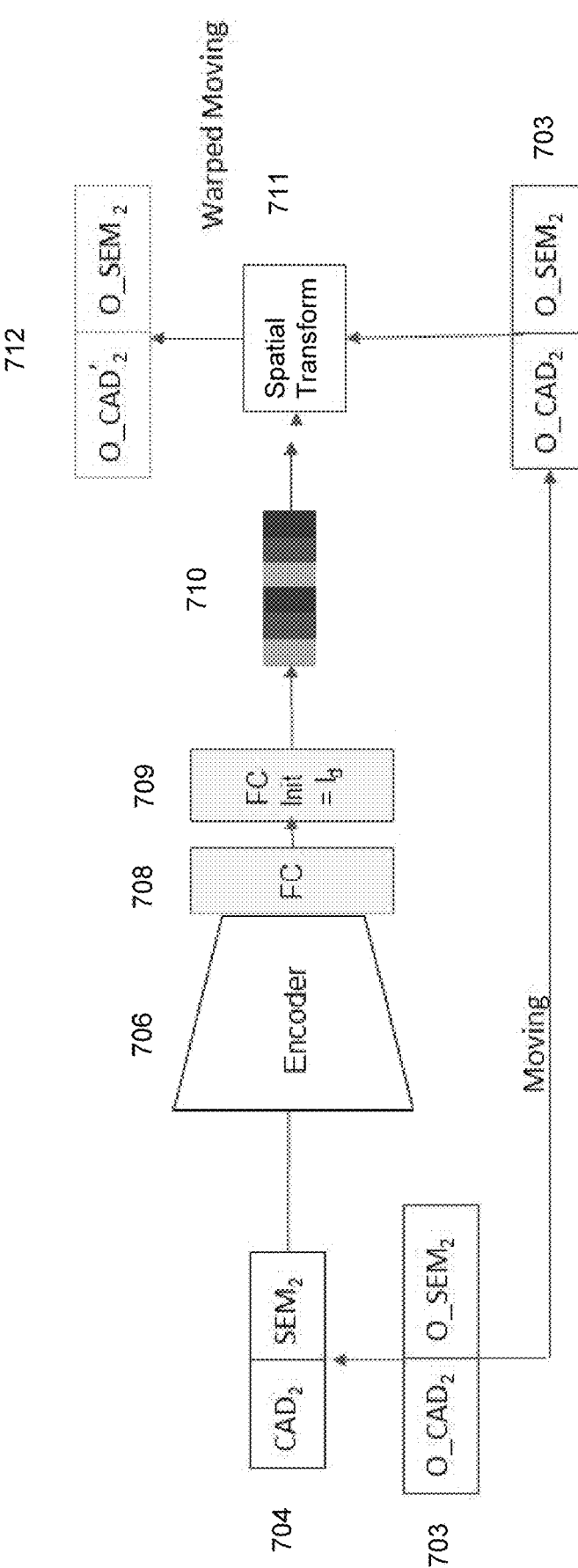
FIG. 7 is a diagram of a trained image registration model, in accordance with some embodiments.

FIG. 7 illustrates an example of using a trained convolutional neural network or model for CAD, SEM registration. The image registration model is used to register CAD images to SEM images, such as CAD image O_CAD₂ to SEM image O_SEM₂ in unaligned pair 703. Unaligned or misaligned image patches 704 which are patches of unaligned pair 703, are input to a trained image registration model comprising an encoder 706 and a fully connected layer 708 to determine an affine transformation which is initialized in a fully connected initialization layer 709. The initialized affine transformation 710 is applied in a spatial transformation 711, outputting aligned images 712 where the CAD image is aligned to the SEM image.

Figures 8A, 8B:
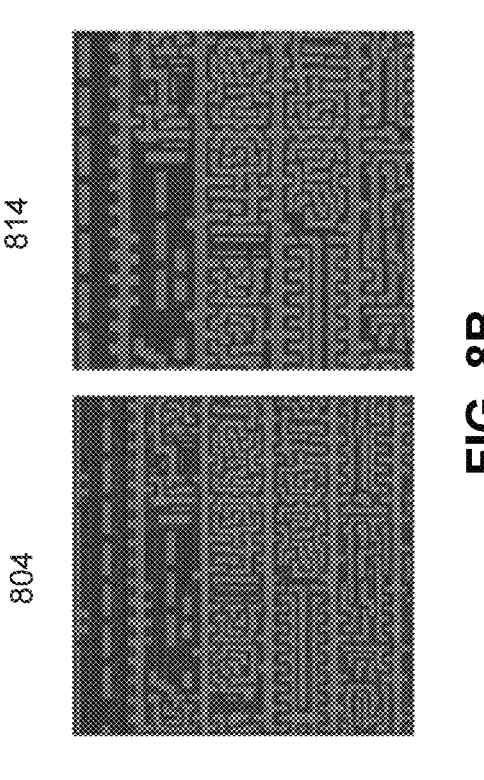
FIGS. 8A and 8B are two examples of unaligned and registered images.

FIGS. 8A and 8B are two examples of CAD images overlaying SEM images to better illustrate unaligned and registered pairs. In FIG. 8A a CAD image and SEM image pair 802 are unaligned. After registration the CAD image and SEM image pair 812 are aligned. In FIG. 8B a different CAD image and SEM image pair 804 are unaligned. In image 814 the CAD image has been registered to the SEM image's coordinate system, such as by using the trained neural network of FIG. 7. Registered images are more useful in various applications including defect identification.

Figure 9:
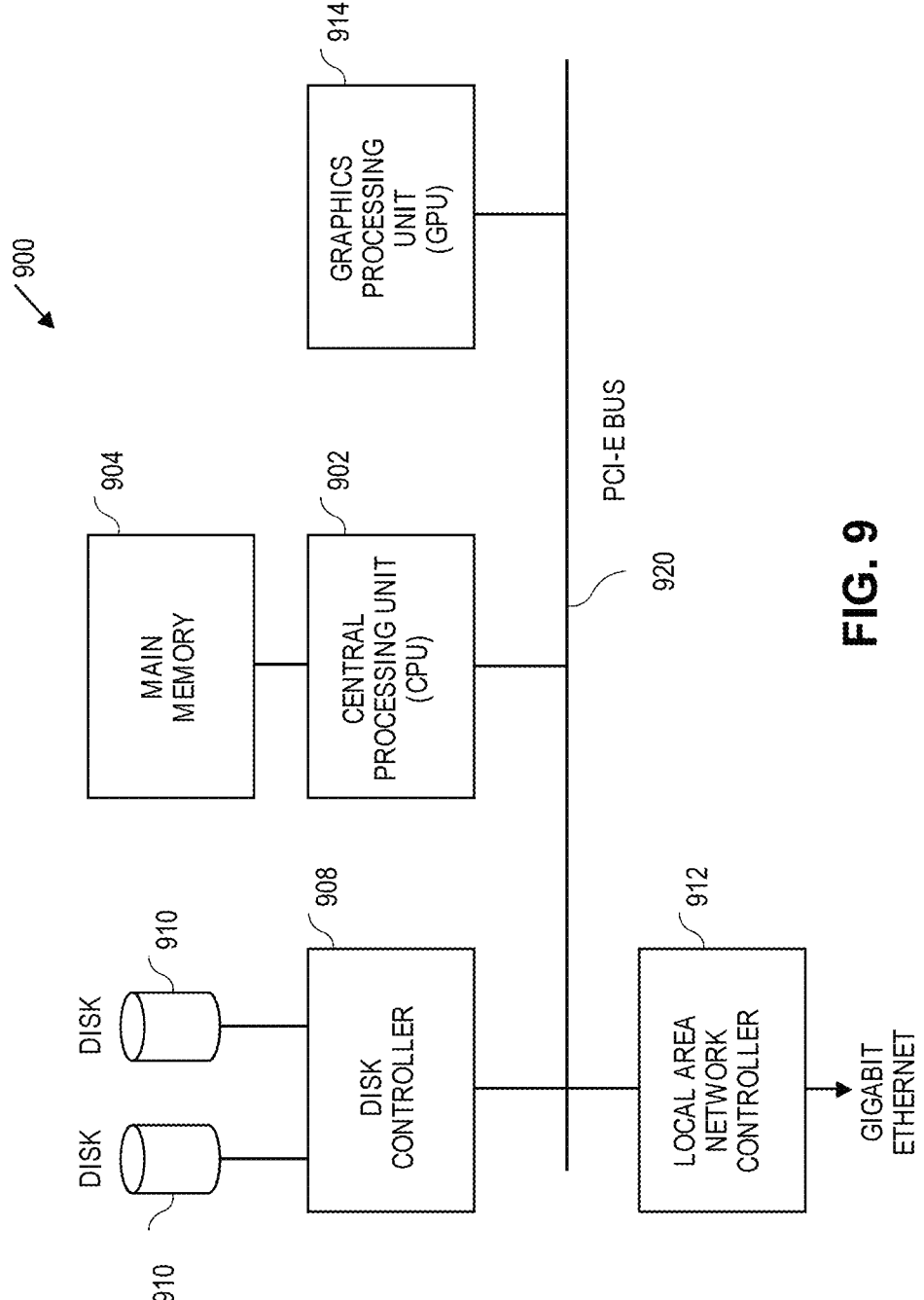
FIGS. 9 and 10 are schematics of GPU systems, in accordance with some embodiments.

FIG. 9 illustrates an example of a computing hardware device 900 that may be used to perform the calculations described in this disclosure. Example calculations include processing convolution and deconvolution layers of a neural network, calculating and comparing loss as well as compressing mask data with a trained neural network. Computing hardware device 900 comprises a central processing unit (CPU) 902, with attached main memory 904. The CPU may comprise, for example, eight processing cores, thereby enhancing performance of any parts of the computer software that are multi-threaded. The size of main memory 904 may be, for example, 64 G-bytes. The CPU 902 is connected to a Peripheral Component Interconnect Express (PCIe) bus 920. A graphics processing unit (GPU) 914 is also connected to the PCIe bus. In computing hardware device 900 the GPU 914 may or may not be connected to a graphics output device such as a video monitor. If not connected to a graphics output device, GPU 914 may be used purely as a high-speed parallel computation engine. The computing software may obtain significantly higher performance by using the GPU for a portion of the calculations, compared to using CPU 902 for all the calculations. The CPU 902 communicates with the GPU 914 via PCIe bus 920. In other embodiments (not illustrated) GPU 914 may be integrated with CPU 902, rather than being connected to PCIe bus 920. Disk controller 908 may also be attached to the PCIe bus, with, for example, two disks 910 connected to disk controller 908. Finally, a local area network (LAN) controller 912 may also be attached to the PCIe bus, and provides Gigabit Ethernet (GbE) connectivity to other computers. In some embodiments, the computer software and/or the design data are stored on disks 910. In other embodiments, either the computer programs or the design data or both the computer programs and the design data may be accessed from other computers or file serving hardware via the GbE Ethernet.

Figure 10:
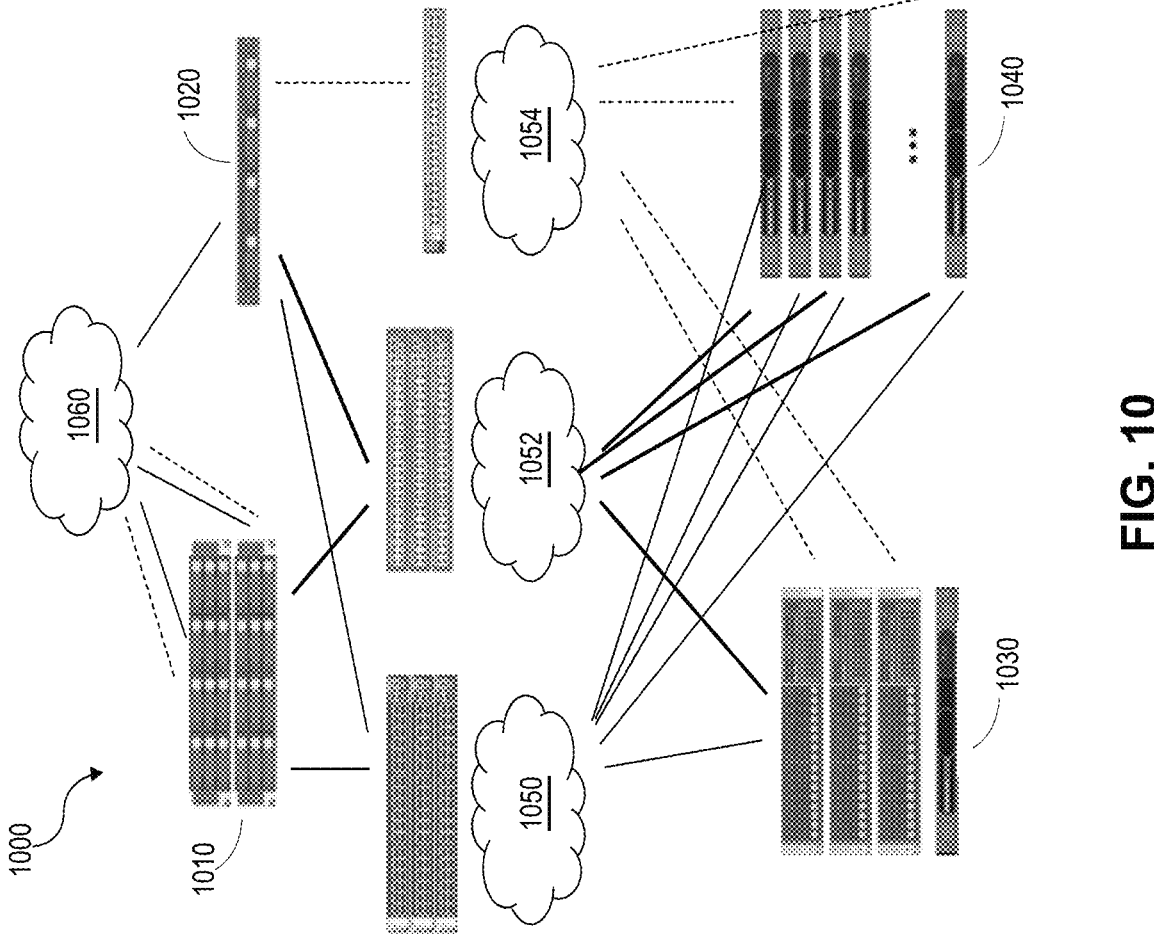

FIG. 10 is another embodiment of a system for performing the computations of the present embodiments. The system 1000 may also be referred to as a Computational Design Platform (CDP), and includes a master node 1010, an optional viewing node 1020, an optional network file system 1030, and a GPU-enabled computing node 1040. Viewing node 1020 may not exist or instead have only one node, or may have other numbers of nodes. GPU-enabled computing node 1040 can include one or more GPU-enabled nodes forming a cluster. Each GPU-enabled computing node 1040 may be, for example, a GPU, a CPU, a paired GPU and CPU, multiple GPUs for a CPU, or other combinations of GPUs and CPUs. The GPU and/or CPU may be on a single chip, such as a GPU chip having a CPU that is accelerated by the GPU on that chip, or a CPU chip having a GPU that accelerates the CPU. A GPU may be substituted by other co-processors.

The master node 1010 and viewing node 1020 may be connected to network file system 1030 and GPU-enabled computing nodes 1040 via switches and high-speed networks such as networks 1050, 1052 and 1054. In an example embodiment, networks 1050 can be a 56 Gbps network, 1052 can be a 1 Gbps network and 1054 can be a management network. In various embodiments, fewer or greater numbers of these networks may be present, and there may be various combinations of types of networks such as high and low speeds. The master node 1010 controls the CDP 1000. Outside systems can connect to the master node 1010 from an external network 1060. In some embodiments, a job is launched from an outside system. The data for the job is loaded onto the network file system 1030 prior to launching the job, and a program is used to dispatch and monitor tasks on the GPU-enabled computing nodes 1040. The progress of the job may be seen via a graphical interface, such as the viewing node 1020, or by a user on the master node 1010. The task is executed on the CPU using a script which runs the appropriate executables on the CPU. The executables connect to the GPUs, run various compute tasks, and then disconnect from the GPU. The master node 1010 can also be used to disable any failing GPU-enabled computing nodes 1040 and then operate as though that node did not exist.

While the specification has been described in detail with respect to specific embodiments, it will be appreciated that those skilled in the art, upon attaining an understanding of the foregoing, may readily conceive of alterations to, variations of, and equivalents to these embodiments. These and other modifications and variations to the present methods may be practiced by those of ordinary skill in the art, without departing from the scope of the present subject matter, which is more particularly set forth in the appended claims. Furthermore, those of ordinary skill in the art will appreciate that the foregoing description is by way of example only, and is not intended to be limiting. Steps can be added to, taken from or modified from the steps in this specification without deviating from the scope of the invention. In general, any flowcharts presented are only intended to indicate one possible sequence of basic operations to achieve a function, and many variations are possible. Thus, it is intended that the present subject matter covers such modifications and variations as come within the scope of the appended claims and their equivalents.

What is claimed is:

1. A system for training a convolutional neural network to register images for masks or wafers in semiconductor manufacturing, the system comprising:
   a computer processor configured to receive a first pair of images aligned in a first modality and a second pair of images aligned in a second modality, wherein images in the first pair of images and the second pair of images are a computer aided design (CAD) image pre-aligned with a scanning electron microscope (SEM) image; and
   a computer processor configured to generate an affine transformation with a convolutional neural network, using one image from the first pair of images and one image from the second pair of images, wherein the one image from the first pair of images is in the first modality and the one image from the second pair of images is in the second modality.

2. The system of claim 1, further comprising:
   a computer processor configured to register the second pair of images with the affine transformation; and
   a computer processor configured to verify the registering of the second pair of images against the first pair of images using normalized cross correlation (NCC) loss.

3. The system of claim 2, wherein the convolutional neural network comprises an encoder with a kernel comprising weights, and wherein the weights are adjusted based on the NCC loss.

4. The system of claim 2, wherein the first pair of images and the second pair of images each comprise a CAD image and a SEM image.

5. The system of claim 4, wherein:
   the one image from the second pair of images is a CAD image;
   the affine transformation is applied only on the CAD image of the second pair of images; and
   the NCC loss is calculated with only the CAD image of the first pair of images and the CAD image of the second pair of images after affine transformation.

6. The system of claim 4, wherein the CAD image of the first pair of images and the second pair of images has been created using lithography simulation.

7. The system of claim 6, wherein the first pair of images and the second pair of images have been synthesized using a digital twin using affine transformation.

8. The system of claim 1, wherein the convolutional neural network further comprises a fully connected layer and an initialization of the affine transformation.

9. The system of claim 1, wherein the affine transformation consists of only scaling, translation and rotation.

10. The system of claim 1, wherein a pair of patches is taken from the first pair of images and the second pair of images; wherein the affine transformation is applied to the second pair of images.

11. The system of claim 10, wherein the pair of patches has a size that is smaller than the first pair of images and the second pair of images.

* * * * *